(12) United States Patent
Yu et al.

(10) Patent No.: US 11,425,466 B2
(45) Date of Patent: Aug. 23, 2022

(54) DATA TRANSMISSION METHOD AND DEVICE

(71) Applicant: Hisense Visual Technology Co., Ltd., Qingdao (CN)

(72) Inventors: Wenqin Yu, Qingdao (CN); Shuo Zhu, Qingdao (CN); Yansong Fu, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/333,891

(22) Filed: May 28, 2021

(65) Prior Publication Data
US 2021/0289263 A1    Sep. 16, 2021

Related U.S. Application Data

(63) Continuation of application No. PCT/CN2020/085630, filed on Apr. 20, 2020.

(30) Foreign Application Priority Data

Jun. 10, 2019 (CN) .......................... 201910495455.8

(51) Int. Cl.
*H04N 21/4788* (2011.01)
*H04N 21/41* (2011.01)
(Continued)

(52) U.S. Cl.
CPC ..... *H04N 21/4788* (2013.01); *H04N 21/4122* (2013.01); *H04N 21/4312* (2013.01); *H04N 21/478* (2013.01); *H04N 21/8586* (2013.01)

(58) Field of Classification Search
CPC ........... H04N 21/4788; H04N 21/4122; H04N 21/4312; H04N 21/478; H04N 21/8586;
(Continued)

(56) References Cited

U.S. PATENT DOCUMENTS

| 9,600,720 B1 * | 3/2017 | Gray ..................... G06K 9/6288 |
| 10,789,519 B1 * | 9/2020 | Wang .................. G06K 9/00973 |

(Continued)

FOREIGN PATENT DOCUMENTS

| CN | 107566891 A | 1/2018 |
| CN | 107911728 A | 4/2018 |

(Continued)

OTHER PUBLICATIONS

International Search Report completed Jun. 3, 2020 for International Application No. PCT/CN2020/085630.

*Primary Examiner* — Nasser M Goodarzi
*Assistant Examiner* — Adil Ocak
(74) *Attorney, Agent, or Firm* — Crowell & Moring LLP

(57) ABSTRACT

Disclosed are a data transmission method and a display device. The method includes: while an environment scene image is presented on a user interface, in response to an instruction for acquiring the environment scene image from a user, upload to a server image information corresponding to the environment scene image acquired from a camera of the display device; receiving an address message associated with the image information sent from the server, and controlling a display of the display device to present in a first area of the user interface a scene recognition image associated with the address message, and to present in a second area of the user interface the environment scene image; wherein the first are and the second area have an overlap portion; where the scene recognition image is able to be scanned by another device for downloading the environment scene image.

14 Claims, 10 Drawing Sheets

(51) Int. Cl.
*H04N 21/431* (2011.01)
*H04N 21/478* (2011.01)
*H04N 21/858* (2011.01)

(58) Field of Classification Search
CPC .... H04N 21/4223; H04N 7/14; H04N 21/426; H04N 21/440263; H04N 21/472; H04N 21/4854; H04N 21/6582; H04N 21/8153; H04N 7/141; H04N 21/4781
See application file for complete search history.

(56) References Cited

U.S. PATENT DOCUMENTS

| | | | |
|---|---|---|---|
| 2006/0218580 A1* | 9/2006 | Bushnell | H04N 21/42204 725/37 |
| 2012/0085819 A1* | 4/2012 | Choi | H04N 21/44008 235/375 |
| 2017/0140190 A1* | 5/2017 | Xu | G06F 16/44 |
| 2018/0342246 A1 | 11/2018 | Chen et al. | |

FOREIGN PATENT DOCUMENTS

| | | |
|---|---|---|
| CN | 108055589 A | 5/2018 |
| CN | 108055590 A | 5/2018 |
| CN | 108111898 A | 6/2018 |
| CN | 108259973 A | 7/2018 |
| CN | 109618206 A | 4/2019 |

* cited by examiner

DATA TRANSMISSION METHOD AND DEVICE

CROSS-REFERENCE

This application is a continuation application of International Application No. PCT/CN2020/085630 filed Apr. 20, 2020, which claims priority to Chinese Patent Application No. 201910495455.8, filed Jun. 10, 2019. The entire disclosures of the above applications are incorporated herein by reference.

TECHNICAL FIELD

The disclosure relates to the field of display technologies, and particularly to a data transmission method and device for displaying images and videos.

BACKGROUND

Display devices have received extensive attention from users, due to the ability for presenting audios, videos and images. With the developments of big data and artificial intelligence, the users' demands for the functions of display devices are increasing day by day. For example, a user wants to see multiple video chat images while the video images are being displayed; or, when the user is in a game scene, the participants' real images are shown in real time; or, when using an educational application, besides watching the images displayed for learning, the student wants to interact with parents/teachers in real time by audio/video chat. However, the current display devices, especially household devices, such as smart TVs, cannot realize the above scenarios because they have no built-in camera.

SUMMARY

The embodiments of the disclosure provide a data transmission method and device, so as to conveniently acquire images taken by a television on the mobile device side.

In a first aspect, a display device according to some embodiments of the application includes: a camera configured to collect an environment scene image; a display configured to display a user interface, wherein the user interface comprises the environment scene image; a communication circuitry configured to exchange data with a server; and a controller, communicating with the display and the communication circuitry. The controller is configured to: while the environment scene image is presented on the user interface, in response to an instruction for acquiring the environment scene image from a user, upload image information corresponding to the environment scene image to the server; and receive an address message associated with the image information sent from the server, and control the display to present in a first area of the user interface a scene recognition image associated with the address message, and to present in a second area of the user interface the environment scene image; wherein the first are and the second area have an overlap portion. Where the scene recognition image is able to be scanned by another device for downloading the environment scene image.

In a second aspect, an embodiment of the disclosure provides a data transmission method, which is applied to a display device and includes: while an environment scene image is presented on the user interface, in response to an instruction for acquiring the environment scene image from a user, uploading to a server image information corresponding to the environment scene image acquired from the camera; and receiving an address message associated with the image information sent from the server, and controlling the display to present in a first area of the user interface a scene recognition image associated with the address message, and to present in a second area of the user interface the environment scene image; wherein the first area and the second area have an overlap portion; where the scene recognition image is scanned and downloaded by the user.

In a third aspect, another embodiment of the disclosure provides a non-transitory computer readable storage medium for storing programs for data transmission thereon, wherein the programs, when executed by a processor, cause the processor to perform: while an environment scene image is presented on the user interface, in response to an instruction for acquiring the environment scene image from a user, uploading to a server image information corresponding to the environment scene image acquired from the camera; and receiving an address message associated with the image information sent from the server, and controlling the display to present in a first area of the user interface a scene recognition image associated with the address message, and to present in a second area of the user interface the environment scene image; wherein the first area and the second area have an overlap portion; where the scene recognition image is scanned and downloaded by the user.

DETAILED DESCRIPTION OF THE EMBODIMENTS

Figure 1:
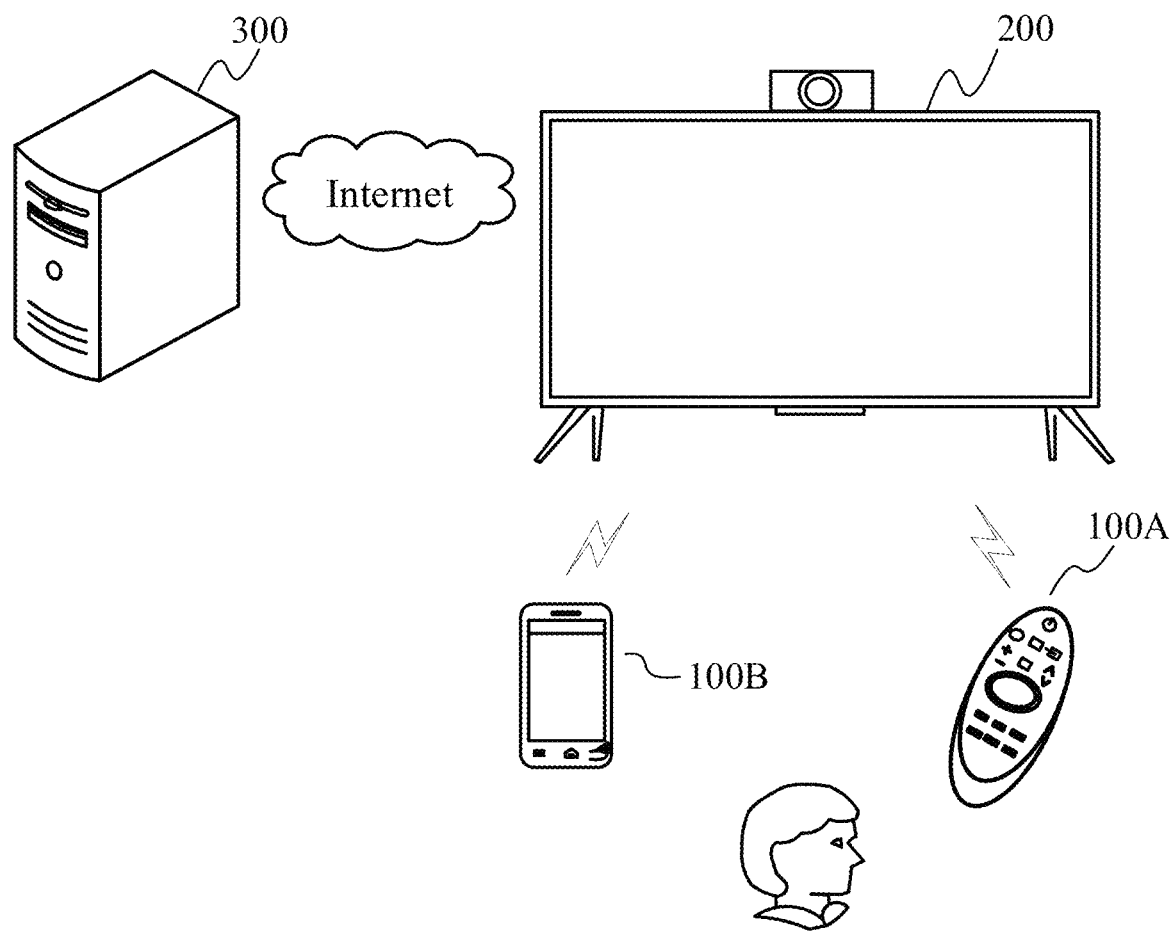
FIG. 1 shows a schematic diagram of an operation scenario between a display device and a control device according to some embodiments of the application.

In order to make the purposes, technical schemes and advantages of the exemplary embodiments of the disclosure clearer, the technical solutions in the exemplary embodiments of the disclosure will be described clearly and completely below in combination with the accompanying drawings in the exemplary embodiments of the disclosure.

Obviously the described exemplary embodiments are a part of the embodiments of the disclosure but not all the embodiments.

For the convenience of users, various external device interfaces are usually provided on the display device to facilitate the connections with different peripheral devices or cables to achieve the corresponding functions. In a case where an external high-definition camera is connected to the display device, if no hardware interface for receiving the source codes of the high-pixel camera is provided in the hardware system of the display device, then the data received by the camera cannot be presented on the display screen of the display device.

In addition, due to the hardware structure, the hardware system of the traditional display device only supports one hard decoding resource, and can usually only supports the decoding of video of at most 4K resolution. Therefore, when a user desires to perform the video chat while watching the Internet TV, in order not to reduce the definition of the network video images, the hard decoding resource (usually, the GPU in the hardware system) is used to decode the network video. However, in this case, the general-purpose processor (such as CPU) in the hardware system can only be used to process the video chat image by soft decoding the video.

The soft decoding process of the video chat images will greatly increase the data processing burden of the CPU. When the data processing burden of the CPU is too heavy, the image may freeze or become unsmooth. Further, due to the data processing capability of the CPU, when the video chat images is processed by CPU through soft decoding, it is usually impossible to realize multi-channel video calls. When a user wants to chat with other users simultaneously by video calls in the same chat scene, the access is easily blocked.

Based on the above considerations, in order to overcome at least the above shortcomings, embodiments of the disclosure disclose a dual-hardware system architecture to support multiple video calls (at least one local video).

The concepts involved in the disclosure will be described below with reference to the drawings. It should be pointed out here that the following description of all the terms is only to make the content of the disclosure easier to be understood, and does not mean to limit the protection scope of the disclosure.

The term "module" used in the embodiments of the disclosure may refer to any known or later developed hardware, software, firmware, artificial intelligence, fuzzy logic, or combination of hardware or/and software codes that can perform the function related to this element.

The term "remote control" used in the embodiments of the disclosure refers to a component of an electronic device (such as the display device disclosed in the disclosure), which can generally control the electronic device wirelessly within a relatively short distance range. This component may generally be connected to the electronic device by using infrared ray and/or Radio Frequency (RF) signal and/or Bluetooth, and may also include the Wireless Fidelity (WiFi) based on the IEEE 802.11b standard, wireless Universal Serial Bus (USB), Bluetooth, motion sensor and other functional modules. For example, the handheld touch remote control uses the user interface in the touch screen to replace most of the physical built-in hard keys in the general remote control device.

The term "gesture" used in some embodiments of the disclosure refers to a user behavior through which the user expresses an expected thought, action, purpose or outcome by a change in hand shape or hand motion, etc.

The term "hardware system" used in some embodiments of the disclosure can refer to a physical component which comprises an integrated circuit (IC), a printed circuit board (PCB) and other mechanical, optical, electrical and magnetic devices and which has the functions of calculation, control, storage, input and output. In some or all embodiments of the disclosure, a hardware system is also usually called as a motherboard or a chip.

FIG. 1 exemplarily illustrates a schematic diagram of an operating scenario between a display device and a control device in an embodiment. As shown in FIG. 1, a user can operate a display device 200 through a control device 100.

Here the control device 100 can be a remote control 100A, and can communicate with the display device 200 through infrared protocol communication, Bluetooth protocol communication, ZigBee protocol communication or other short-distance communication methods, to control the display device 200 through wireless or other wired methods. A user can input user instructions through keys, voice input and control panel input on the remote control, to control the display device 200. For example, the user can input corresponding control instructions through the volume up and volume down keys, channel control keys, up/down/left/right directional keys, voice input key, menu key, power key and the like on the remote control, to control the functions of the display device 200.

The control device 100 can also be a smart device, for example, a mobile terminal 100B, a tablet computer, a computer, a notebook computer, etc., and can be communicated with the display device 200 through a local area network (LAN), a wide area network (WAN), a wireless local area network (WLAN) or other networks, and can control the display device 200 through an application corresponding to the display device 200. For example, the display device 200 can be controlled through an application running on a smart device. The application can provide various controls for the user on a screen related to a smart device through an intuitive user interface (UI).

The "user interface" is a medium interface for interaction and information exchange between applications or operating systems and users. It realizes the conversion between the internal form of information and the form acceptable to users. The commonly-used form of the user interface is Graphic User Interface (GUI), which refers to a user interface related to computer operations that is displayed in a graphical manner. It may comprise an interface element such as icon, window, control or the like displayed on the display screen of an electronic device, wherein the controls may include icon, button, menu, tab, text box, dialog box, status bar, navigation bar, Widget, and other visual interface elements.

Exemplarily, the mobile terminal 100B and the display device 200 can be both installed with software applications, so as to realize communication between the two through a network communication protocol, and further to realize one to one control operation and data communication. For example, a control instruction protocol can be established between the mobile terminal 100B and the display device 200, a remote control keyboard is synchronized to a mobile terminal 100B, and the function of controlling a display device 200 can be realized through controlling the user interface on the mobile terminal 100B; and audio and video contents displayed on the mobile terminal 100B can also be transmitted to a display device 200 to realize the function of synchronous display.

As shown in FIG. 1, the display device 200 can also communicate data with the server 300 through multiple communications. In some or all embodiments of the disclosure, the display device 200 is allowed to be in communication connection with the server 300 through a local area network, a wireless local area network or other networks. The server 300 can provide various contents and interactions to the display device 200.

Exemplarily, the display device 200 receives software application updates or accesses remotely stored digital media libraries through sending and receiving information and electronic program guide (EPG) interaction. The server 300 can be a group or multiple groups of servers, and can also be one or more types of servers. Video on demand and advertising services and other network services can be provided through a server 300.

The display device 200, on the one hand, can be a liquid crystal display, an OLED (Organic Light Emitting Diode) display, and a projection display device. On the other hand, the display device can be a display system composed of a smart television or a display and a set top box. The disclosure does not intend to limit specific type, size and resolution ratio of the display device. Those skilled in the art should understand that some changes can be made to the performance and configuration of the display device 200 as required.

In addition to providing a broadcast reception television function, the display device 200 can further provide an intelligent network television function that support by computer. Exemplarily, a network television, a smart television, an internet protocol television (IPTV) and the like are included. In some embodiments, the display device may not provide with broadcast reception television function.

As shown in FIG. 1, the display device connects with a camera or has a camera built-in or attached, and is configured to present images captured by the camera on the display interface of the display device or another display device, to realize interactions between users. In some embodiments, the images captured by the camera can be displayed in full screen or half screen on the display device, or any optional area can be displayed.

As an alternative connection, the camera is connected with a rear shell of the display device through a connecting plate, and is fixed on the middle part of the upper side of the rear shell of the display. As for the installation manner, the camera may be amounted at any position of the rear shell of the display, as long as an image capture area of the camera is not shielded by the rear shell. For example, the image acquisition area covers the display direction of the display device.

As another alternative connection, the camera may be connected with a rear shell of a display through a connecting plate or other suitable connectors in a way that is able to go up and go down. The connector is provided with a motor for moving up and down, when a user wants to use the camera or when an application wants to invoke the camera, the camera is being moved up above the display, and when the camera is not needed, the camera can be embedded into the rear shell, to protect the camera from being damaged.

As an embodiment, the camera used in the disclosure can be of 16 megapixels, to achieve the purpose of ultrahigh definition display. In some implementations, a camera with the pixels being greater than or lower than 16 megapixels can also be adopted.

When the display device has a camera, the contents displayed by the display device in different application scenarios can be combined in multiple different ways, to realize functions which cannot achieve by traditional display devices.

In some embodiments, a user may conduct video chat with at least one user while watching a video program. The video program window can be presented as a background, while the window of video chat can be displayed superposing the background. The function can be called as "chatting while watching".

In some embodiments, in "chatting while watching" context, at least one video chat with another terminal is conducted while live video or network video is being watched.

In some embodiments, a user can conduct a video chat with one or more other user while using an education application for learning. For example, a student can realize remote interaction with a teacher while learning via an education application. The function can be called as "chatting while learning".

In some embodiments, while a user is playing a card game, the user is able to have a video chat with other users from the same game. For example, after launching a game application to participate in the game, a player is able to interact with other players remotely. The function can be vividly called as "playing while watching".

In some embodiments, game scenarios are fused with video images, and the portrait in the video image is cutout and pasted on the face of a character in the game and displayed in the game image, thereby improving user experience.

In some embodiments, in motion-sensing games (such as ball games, boxing, running and dancing), through a camera, poses and movements of the users are acquired, and after detecting body movements and tracking and detecting of key data points of human skeleton, they can fuse with animation images in the game to realize games such as sports games and dance games.

In some embodiments, in a karaoke scenario, a user is able to video chat with at least one other user. The function can be vividly called as "singing while watching". In some embodiments, when at least one user launches the karaoke application during chatting, these multiple users can record a song together.

In some embodiments, a user can turn on a local camera to have images and videos captured, and the function can be vividly called as "looking in a mirror".

In some embodiments, additional functions can be included or the above functions can be excluded. The functions of the display device are not specifically defined in the disclosure.

Figure 2:
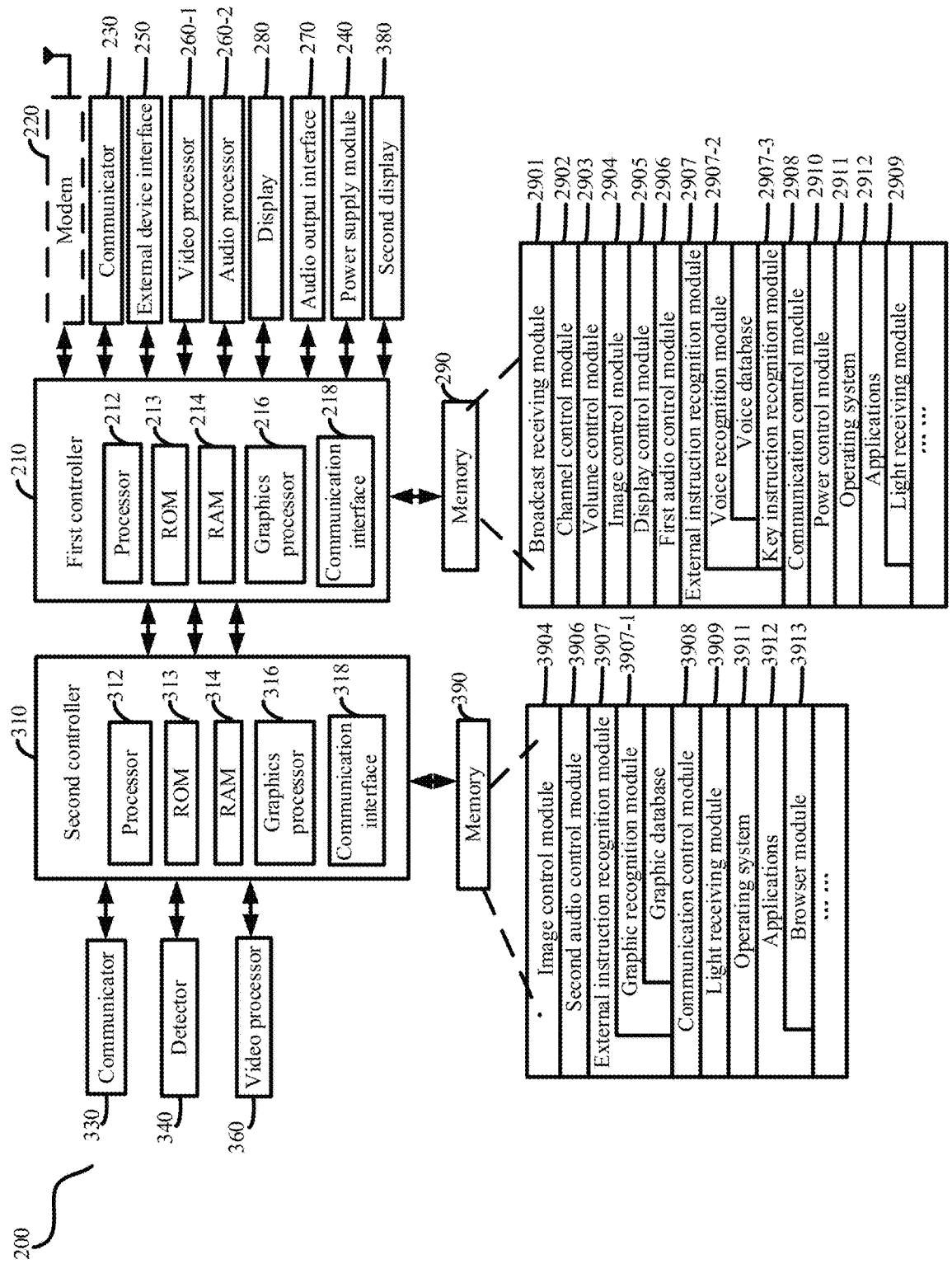
FIG. 2 illustrates an example functional configuration of a display device 200 according to some embodiments of the application.

FIG. 2 exemplarily shows a schematic diagram of the functional configuration of the display device according to an exemplary embodiment.

In some embodiments, as shown in FIG. 2, a block diagram of the hardware configuration of a hardware system in the display device 200 with dual chips is given.

For ease of description, a hardware system in the dual-hardware system architecture is referred to as the first hardware system or system A or chip A, and the other hardware system is referred to as the second hardware system or system N or chip N. Chip A includes a controller of chip A and various interfaces, while chip N includes a controller of chip N and various interfaces. Chip A and chip N can be respectively installed with a relatively independent operating system, to allow the display device 200 to have two independent but interrelated subsystems.

In some embodiments, the chip N may also be referred to as the first chip or first controller, and the chip A may also be referred to as the second chip or second controller.

As shown in FIG. 2, the hardware systems of the display device 200 may include the chip A and the chip N, and modules connected to the chip A or the chip N through various interfaces.

Chip N can include at least one of a modem 220, a communicator 230, an external device interface 250, a first controller 210, a memory 290, a user input interface, a video processor 260-1, an audio processor 260-2, a display 280, an audio output interface 272, and a power supply. In other embodiments, chip N can also include more modules or less modules.

Here the modem 220 is configured to receive broadcast signals in a wired or wireless manner, and then perform modulation and demodulation process such as amplification, frequency mixing and resonance, in order to demodulate the audio and video signals carried in the frequency wave of the television channel selected by the user and additional information (such as EPG data signals) from multiple wired or wireless broadcast television signals. According to the broadcasting system of different television signals, the modem 220 has many signal types, such as terrestrial broadcasting, wired broadcasting, satellite broadcasting or internet broadcasting. According to different modulation types, the signal modulation mode can be either a digital modulation mode or an analog modulation mode. According to different types of received television signals, the modem 220 can demodulate analog signals and/or digital signals.

The modem 220 is further configured, according to user selection and under the control of the first controller 210, to respond to television channel frequency selected by a user and the television signals carried by the frequency wave.

In some other exemplary embodiments, the modem 220 can also be in an external device, for example, an external set top box. In this way, the set top box outputs television audio and video signals after modulation and demodulation, and inputs the television audio and video signals to the display device 200 through an external device interface 250.

The communicator 230 is a component configured to communicate with an external device or an external server according to various communication protocol types. For example, the communicator 230 can include a WiFi module, a Bluetooth communication protocol module, a wired Ethernet communication protocol module, an infrared communication protocol module and other network communication protocol modules or near-field communication protocol modules.

In some exemplary embodiments, the Bluetooth communication protocol module may be a separate chip.

In other exemplary embodiments, the Bluetooth communication protocol module may also be a Bluetooth communicator.

The display device 200 can establish connections for control signal and data signal with an external control device or a content providing device through a communicator 230. For example, the communicator can receive control signals from the remote control 100A under the control of a controller.

The external device interface 250 is a component which provides data transmission between a first controller 210 of the chip N, and a chip A and other external devices. The external device interface can be connected with an external device such as a set top box, a gaming device and a notebook computer in a wired/wireless manner, and can receive such data as video signals (for example, motion image), audio signals (for example, music) and additional information (for example, EPG) of an external device.

Here the external device interfaces 250 can include: any one or more of a high definition multimedia interface (HDMI) terminal, a composite video blanking synchronization (CVBS) terminal, an analog or digital component terminal, a universal serial bus (USB) terminal, and a red, green and blue (RGB) terminal (not shown in the figure). The number and type of interfaces of the external device are not limited in the disclosure.

The first controller 210 controls the operation of the display device 200 and responds to the operation of the user through running various software control programs (such as an operating system and/or various applications) stored on the memory 290.

As shown in FIG. 2, the first controller 210 includes a read-only memory (ROM) 213, a random access memory (RAM) 214, a graphics processor 216, a CPU processor 212, a communication interface 218, and a communication bus. Here, the ROM 213, the RAM 214, the graphics processor 216, the processor 212 and the communication interface 218 are connected through a bus.

The ROM 213 is configured to store various system start instructions. For example, upon receiving a power on signal, the power supply of the display device 200 begins to start, the CPU processor 212 runs the system initialization instructions in the ROM, and copies the temporary data generated by the operating system stored in the memory 290 to an RAM 214, to run or start the operating system. After the operating system is started, the CPU processor 212 copies temporary data generated by various applications in the memory 290 to the RAM 214, and then runs or launches various applications.

The graphics processor 216 is configured to generate various graphic objects, such as icons, menus for operations and display graphics for user input instruction, etc. An arithmetic unit is included, and the arithmetic unit operates through receiving various interactive instructions input from the user, and displays various objects according to display attributes. A renderer is included, and the renderer is configured to generate various objects obtained based on the arithmetic unit, and display the rendered results on the display 280.

The processor 212 is configured to execute operating systems and application instructions stored in the memory 290, and execute various applications, data and contents according to received various interactive instructions input externally, to finally display and play various audio and video contents.

In some exemplary embodiments, the CPU processor 212 can include multiple processors. Multiple processors can include one master processor and one or more sub-processor. The master processor is configured to perform some operations of the display device 200 in a precharging mode, and/or display the images in a normal mode. One or more sub-processor is configured to perform a type of operation in a standby mode.

A communication interface can include a first interface to the nth interface. These interfaces can be network interfaces connected to an external device via a network.

The first controller 210 can control the overall operation of the display device 200. For example, in response to receiving user commands for select the UI objects displayed on the display 280, the controller 210 will perform operations related to an object selected by user commands.

Here the object can be any one of available objects for selection, such as a hyperlink or an icon. The operations related to selected objects for example include: operations for displaying the hyperlinked page, document or image, or operations for launching applications corresponding to icons. User commands for selecting a UI object can be commands input from various input devices (for example, a mouse, a keyboard, a touch pad, etc.) connected to the display device 200 or voice commands corresponding to voices from the user.

The memory 290 is configured to store various software modules for driving and controlling the display device 200. For example, various software modules stored in the memory 290 include a basic module, a detection module, a communication module, a display control module, a browser module and various service modules.

Here, the basic module is an underlying software module for signal communication between respective hardwares in the display device 200 and for sending processing and controlling signals to an upper layer module. The detection module is a management module configured to collect various types of information from various sensors or the user input interfaces and perform digital-to-analogue conversion and analysis management.

For example, a voice recognition module includes a voice analysis module and a voice instruction database module. The display control module is a module configured to control the display 280 to display image, and can be configured to play multimedia image and UI interface and other information. The communication module is a module configured to perform control and data communication with an external device. The browser module is a module configured to perform data communication with browsing servers. The service module is a module configured to provide various services and various applications.

Meanwhile, the memory 290 is further configured to store received external data and user data, images of respective items in various user interfaces, and visual effect images of focus objects, etc.

The user input interface is configured to send input signals from a user to the first controller 210, or transmit signals output from a controller to the user. Exemplarily, the control device (for example, a mobile terminal or a remote control) can send input signals, such as power on or power off signals, channel selection signals and volume adjustment signals, input from the user to the user input interface, and then transmit the input signals to the controller through the user input interface. Or, the control device can receive output signals such as audios, videos or data processed by the controller and output through the user input interface, and display the received output signals or output the received output signals in an audio or vibration form.

In some embodiments, the user can input user commands to the graphical user interface (GUI) displayed on the display 280, and the user input interface receives user input commands through the graphical user interface (GUI). Or, the user can input user commands by inputting voices or gestures, then the user input interface receive the user input commands through voices or gestures recognition by a sensor.

The video processor 260-1 is configured to receive video signals, and perform video data processing such as decompressing, decoding, scaling, noise reduction, frame rate conversion, resolution ratio conversion and image synthesis according to a standard coding and decoding protocol of input signals, to obtain video signals which can be directly displayed or played on the display 280.

Exemplarily, the video processor 260-1 includes a demultiplexing module, a video decoding module, an image synthesis module, a frame rate conversion module, and a display formatting module, etc.

Here the demultiplexing module is configured to perform demultiplexing on the input audio and video data streams, for example, when an MPEG-2 signal is input, then the demultiplexing module demultiplexes the input MPEG-2 signal into video signals and audio signals.

A video decoding module is configured to process video signals after demultiplexing, where the processing includes decoding and scaling, etc.

The image synthesis module, such as an image synthesizer, is configured to superimpose and mix the GUI signals with the scaled video images, to generate an image signal for display. Here the GUI signals are generated by the graphics generator according to user input or generated by the graphics generator itself.

The frame rate conversion module is configured to convert the frame rate of the input videos, for example, the frame rates of 24 Hz, 25 Hz, 30 Hz and 60 Hz of the input videos are converted into frame rates of 60 Hz, 120 Hz or 240 Hz. Here the input frame rate can be related to the source video streaming, and the output frame rate can be related to the refreshing rate of the display. The input has an ordinary format, such as frame interpolation method.

The display formatting module is configured to convert signals output from the frame rate conversion module into signals with format conforming to the display format of a display. For example, format conversion is performed on the signals output from the frame rate conversion module to output RGB data signals.

The display 280 is configured to receive image signals input from the video processor 260-1, and display video contents and images and a menu control interface. The display 280 includes a display component configured to display images and a driving component configured to drive image display. The displayed video can be videos in the broadcast signals received from modem 220, and can also be video input from the communicator or the external device interface. The display 220 can simultaneously display the user control interface (UI) generated in the display device 200 and configured for controlling the display device 200.

In some embodiments, there are different types of display. The display 280 can further include a driving component for driving display. Or, if the display 280 is a projection display, the display 280 can further include a projection device and a projection screen.

The audio processor 260-2 is configured to receive audio signals, and perform decompressing and decoding, and noise suppression, digital-to-analogue conversion, amplification and other audio data processing according to a standard encoding and decoding protocol of input signals, to obtain audio signals for play in the loudspeaker 272.

The audio output interface 270 is configured to receive audio signals output from the audio processor 260-2 under the control of the controller 210. The audio output interface can include a loudspeaker 272, or an external audio output terminal 274 configured for outputting to the sound generator of the external device. For example, the external audio output terminal can be an external audio terminal or a headphone output terminal, etc.

In some other exemplary embodiments, the video processor 260-1 can include one or more chips. The audio processor 260-2 can also include one or more chips.

In addition, in some other exemplary embodiments, the video processor 260-1 and the audio processor 260-2 are made of separate chips, and can also be integrated into one or more chips together with the first controller 210.

The power supply module 240 is configured to, under the control of the first controller 210, provide power to the display device 200 by the power input from the external power supply. The power supply can include an internal power circuit installed inside the display device 200. Also, the power supply can be an external power installed outside the display device 200, accordingly a power interface for an external power is provided in the display device 200.

Similar to chip N, as shown in FIG. 2, chip A includes a second controller 310, a communicator 330, a detector 340 and a storage 390. In some embodiments, chip A further includes a user input interface, a video processor, an audio processor, a display, and an audio output interface. In some embodiments, there is an individual power supply for providing power to chip A (not shown in FIG. 2).

The communicator 330 is a component for communicating with an external device or an external server according to various types of communication protocol. For example, the communicator 330 includes a WiFi module, a Bluetooth communication protocol module, a wired Ethernet communication protocol module, an infrared communication protocol module and other network communication protocol modules or near-field communication protocol modules.

The communicator 330 in chip A has interactions with the communicator 230 in chip N. For example, the WiFi module in chip N is configured to connect an external network and establish network communication with an external server, etc. The WiFi module in chip A is configured to connect to the WiFi module in chip N, instead of being directly connected with an external network. As such, chip A is connected with an external network through chip N. Therefore, for the user, a display device in the above embodiment can display information of one WiFi account available for use.

The detector 340 is a component for collecting signals about external environment or interactions with outside. The detector 340 can include an optical receiver 342 which is a sensor for collecting ambient light intensity and the display parameters can adapt according to the collected ambient light. Further, the detector 340 can include an image collector 341, such as a camera, a webcam and the like. The image collector 341 is configured to collect external environment scenes, collect user attribute or gestures of the user, so that the display parameters can change accordingly and user gestures can be recognized, to allow the interactions with users.

The external device interface is a component for data transmission between the controller 310 and chip N or other external devices. The external device interface can be connected with external devices such as a set top box, a gaming device and a notebook computer in a wired/wireless manner.

The second controller 310 controls the operation of the display device 200 and responds to the operation of the user through running various software control programs (such as installed third-party applications) stored on the memory 390 and through interaction with chip N.

As shown in FIG. 2, the second controller 310 includes a read-only memory (ROM) 313, a random access memory (RAM) 314, a graphics processor 316, a CPU processor 312, a communication interface 318, and a communication bus. Wherein, the ROM 313, the RAM 314, the graphics processor 316, the CPU processor 312 and the communication interface 318 are connected through a bus.

The ROM 313 is configured to store various system startup instructions. The CPU processor 312 runs the system startup instructions in the ROM, and copies the temporary data stored in the operating system of the memory 390 to an RAM 314, to run or start an operating system. After the operating system is started, the CPU processor 312 copies temporary data of various applications in the memory 390 to the RAM 314, to run or launch various applications.

The processor 312 is configured to run operating systems and application instructions stored in the memory 390, perform communication, signal, data, instruction and other transmission and interaction with chip N, and run various applications, data and contents according to received various interactive instructions input externally, to finally display and play various audio and video contents.

A communication interface can include a first interface 318-1 to the $n^{th}$ interface 318-n. These interfaces can be network interfaces connected to an external device via a network, and can also be network interfaces connected to chip N via the network.

The second controller 310 is able to control the overall operation of the display device 200. For example, in response to receiving the user commands for selecting the UI objects displayed on the display 280, the controller 210 will perform operations related to the object selected by the user's commands.

The graphics processor 316 is configured to generate various graphic objects, such as icons, menus for operation and display graphics for user instruction input, etc. An arithmetic unit is included, and the arithmetic unit operates through receiving various interactive instructions input from the user, and displays various objects according to display attributes. A renderer is included, and the renderer is configured to generate various objects obtained based on the arithmetic unit, and display the rendered results on the display 280.

The graphics processor 316 in chip A and the graphics processor 216 in chip N can both generate various graphic objects. If application 1 is installed in chip A, and application 2 is installed in chip N, when the user is on an interface of application 1, and the user inputs instructions for application 1, then the graphics processor 316 in chip A generates graphic objects. When the user is on an interface of application 2, and the user inputs instructions for application 2, the graphics processor 216 in chip N generates graphic objects.

As shown in FIG. 2, the memory 390 of the second controller and the memory 290 of the first controller are respectively configured to store the operating system, applications, content, user data and the like, and drive the system of the display device 200 and respond to various operations from the user under the control of the second controller 310 of chip A and the first controller 210 of chip N. The memory 390 of the second controller and the memory 290 of the first controller may include a volatile and/or a nonvolatile memory.

The memory 290 of the first controller is configured to store running programs for driving the first controller 210 in the display device 200, and store various applications in the display device 200, various applications downloaded by the user from external devices, various graphical user interfaces related to applications, various objects related to graphical user interfaces, user data information and various internal data supporting applications. The memory 290 is configured to store a kernel, a middleware, applications and other system software of an operating system (OS), and store input video data and audio data, and other user data.

The memory 290 is configured to store the video processor 260-1 and the audio processor 260-2, the display 280, the communication interface 230, the modem 220, an input/output interface and other driving programs and related data.

In some embodiments, the memory 290 can store software and/or programs, and software applications for an operating system (OS) include: for example, a kernel, a middleware, an application interface (API) and/or applications. Exemplarily, the kernel is used to control or manage system resources, or functions implemented by other programs (for example, the middleware, the API or applications). The kernel provides an interface, to allow the middleware and the API or applications to access the controller, to control or manage system resources.

Exemplarily, the memory 290 includes a broadcast receiving module 2901, a channel control module 2902, a volume control module 2903, an image control module 2904, a display control module 2905, an audio control module 2906, an external instruction recognition module 2907, a communication control module 2908, an optical receiving module 2909, a power control module 2910, an operating system 2911 and other applications 2912 and a browser module, etc. Through running various software applications in the memory 290, the controller 210 execute broadcast television signal reception and demodulation, television channel selection control, volume selection control, image control, display control function, audio control, external instruction recognition, communication control, optical signal reception, power control, software control platforms supporting various functions, and browser function.

The memory 390 is configured to store various software modules for driving and controlling the display device 200. For example, various software modules stored in the memory 390 include a basic module, a detection module, a communication module, a display control module, a browser module and various service modules. Since the functions of the memory 390 are similar to the functions of the memory 290, the related parts of the memory 390 can be referred to the memory 290 and will omit herein.

Exemplarily, the memory 390 includes an image control module 3904, an audio control module 3906, an external instruction recognition module 3907, a communication control module 3908, an optical receiving module 3909, an operating system 3911 and other applications 3912 and a browser module 3913, etc. Through running various software applications in the memory 390, the controller 310 performs such functions as image control, display control, audio control, external instruction recognition, communication control, optical signal reception, power control, software control platforms supporting various functions, and browser function.

As for the difference, the external instruction recognition module 2907 in chip N and the external instruction recognition module 3907 in chip A can recognize different instructions.

Exemplarily, since an image receiving device such as a camera is connected with chip A, the external instruction recognition module 3907 in chip A can include an image recognition module 3907-1. The image recognition module 3907-1 stores a graphic database, when the camera receives external graphic instructions, the received graphic instructions are matched with the instructions in the graphic database, to control the display device according to instructions. Since the voice receiving device and the remote control are connected with chip N, the external instruction recognition module 2907 in chip N can include a voice recognition module 2907-2, the voice recognition module 2907-2 stores a voice database, when the voice receiving device receives external voice instructions, the received external voice instructions are matched with the instructions in the voice database, to control the display device according to instructions. Similarly, the remote control and other control devices 100 are connected with chip N, and instructions are interchanged between a button instruction recognition module and the control device 100.

It should be noted that the dual-chip structure with the first controller and the second controller as shown in FIG. 2 is only an exemplary embodiment, and it may also be a display not with the dual system (that is, a not a dual-chip structure). For example, there may be one controller (hardware system) to realize the functions of the above two controllers, or there may be more than two controllers (hardware systems), which is not limited by the disclosure. In a specific implementation, a suitable chip architecture can be selected according to the actual requirement and chip performance.

Figure 3A:
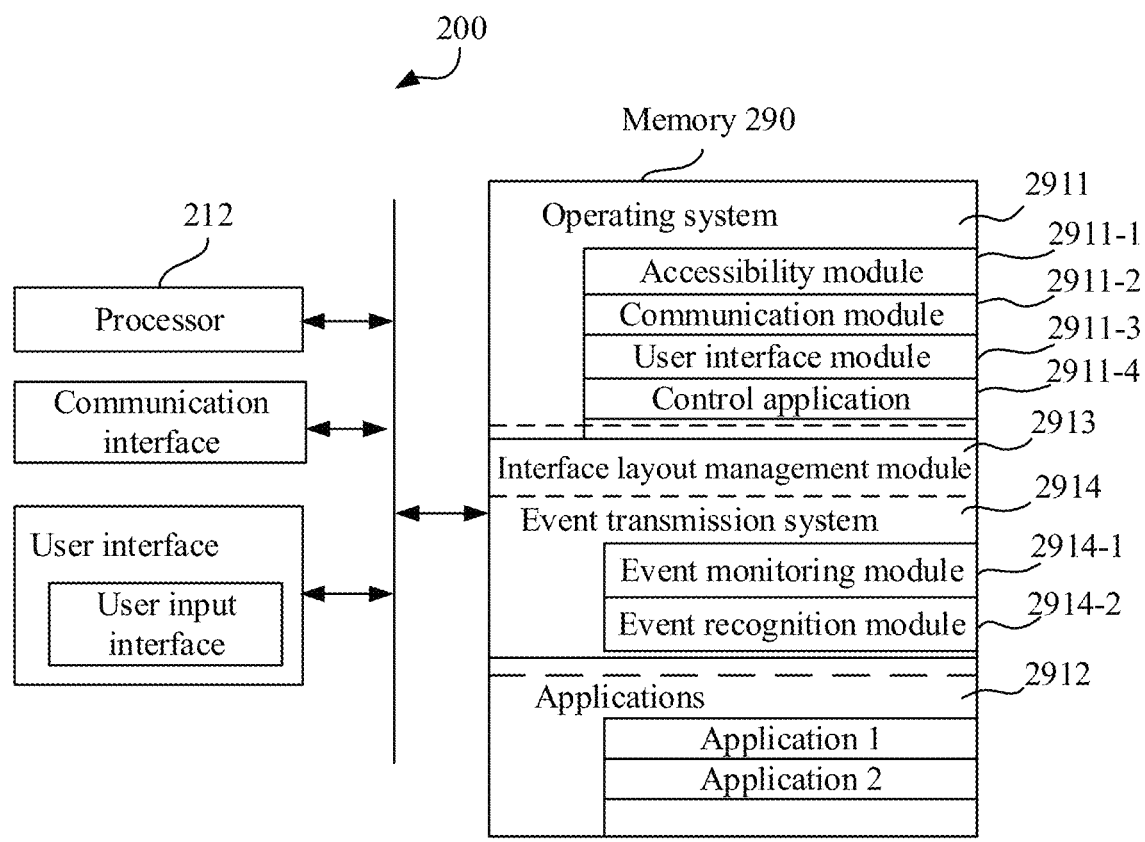
FIG. 3A illustrates an example software configuration in the display device 200 according to some embodiments of the application.

FIG. 3A exemplarily illustrates the block diagram of configuration of a software system in the display device 200 in the exemplary embodiment.

For the first controller, as shown in FIG. 3A, the operating system 2911 includes operating software for processing various basic system services and perform hardware-related tasks, and serves as a medium between applications and hardware components for completing the data processing.

In some embodiments, part of the kernel of the operating systems includes a series of software for managing hardware resources of the display device, and providing service to other programs or software codes.

In other some embodiments, part of the kernel of the operating systems includes one or more device drivers. The device driver can be a group of software codes in the operating system to help to operate or control devices or hardware related to the display device. The driver can include codes for operations on videos, audios and/or other multimedia components. Exemplarily, a display, a camera, Flash, WiFi and an audio driver are included.

Here the access module 2911-1 is configured to modify or access applications, to realize access of applications and operations of the displayed contents.

The communication module 2911-2 is configured to connect with other external devices via related communication interface and communication network.

A user interface module 2911-3 is configured to provide objects on the user interface, to allow access of various applications and operations of the user.

The control application 2911-4 is configured to control process management and includes running time applications, etc.

An event dispatch system 2914 can be implemented in the operating system 2911 or the application 2912. In some embodiments, the event dispatch system 2914 is implemented in the operating system 2911 and the application 2912, and is configured for monitoring various user input events, and performs a set or several sets of predefined operations according to results of recognized responses corresponding to various events or sub-events.

Here the event listener module 2914-1 is configured to listen to events or sub-events input through the user input interface.

The event recognition module 2914-2 is configured to recognize various events or sub-events according to the definitions of various events input through various user input interfaces, and dispatch the events or sub-events to a processor to execute the corresponding one or more sets of processing programs.

Here the event or sub-event refers to the input detected by one or more sensors in the display device 200, and the input of an external control device (for example, a control device 100 and the like). For example, various sub-events input via voice, gesture input sub-events for gesture recognition, and sub-events input via remote key of a control device. Exemplarily, the one or more sub-events of the remote control include various forms, and include but not limited to one or a combination of operations including pressing up/down/left/right key, ok key, and a pressing and holding operation. The one or more sub-events also include operations of non-physical keys, such as moving, holding, releasing, etc.

The interface layout management module 2913 is configured to directly or indirectly receive various user input events or sub-events monitored by the event dispatch system 2914, to update the layout of a user interface. The update includes but not limited to updating positions of respective controls or child controls on the interface, size or position of a container, and hierarchy, and various other operations related to interface layout.

Since the function of the operating system 3911 in chip A is similar to the function of the operating system 2911 in chip N, the related parts can refer to the operating system 2911 and will omit herein.

Figure 3B:
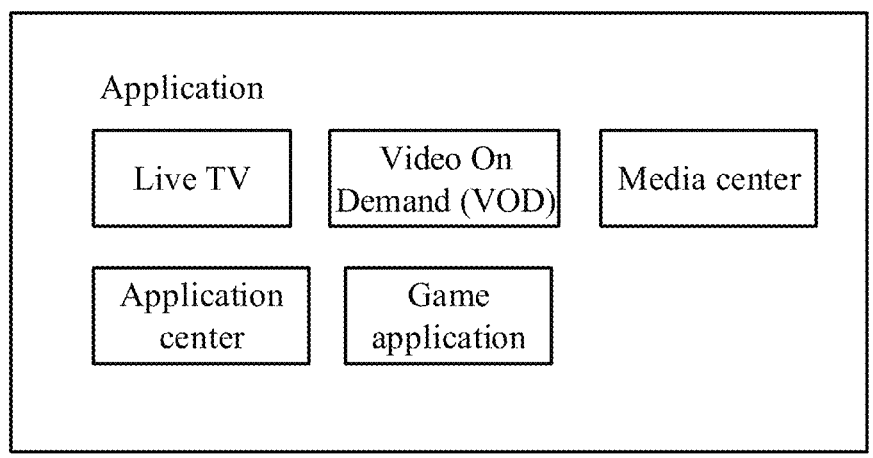
FIG. 3B illustrates an example configuration of an application in the display device 200 according to some embodiments of the application.

As shown in FIG. 3B, the application layer of the display device includes various applications executable in the display device 200.

The application layer 2912 of chip N includes but not limited to one or more applications, for example, a video on demand application, an application center, a game application, etc. The application layer 3912 in chip A includes but not limited to one or more applications, such as a live television application and a media center application, etc. It should be noted that, chip A and chip N respectively contain applications according to the operating system and other designs, and the specific definition and the classification of the applications are not intend to limit herein.

The live television application can provide live television through different signal sources. For example, the live television application can provide television signals using input from cable television, radio broadcast, satellite service or other types of live television services. In addition, the live television application can display videos of live television signals on the display device 200.

The video on demand application can provide videos from different storage sources. Different from the live television application, the video on demand provides video display from some storage sources. For example, the video on demand can come from a server side of cloud storage, and a local hard disk storage containing stored video programs.

The media center application is an application which can play various multimedia contents. For example, the media center is different from live television or video on demand, and the user is able to access various images or services provided by audios through the media center application.

The application center can store various applications. The application can be a game application, an application, or some other applications related to the computer system or other devices but capable of running in the display device. The application center can acquire these applications from different sources, and store them in the local memory, and then the applications can run on the display device 200.

Figure 4:
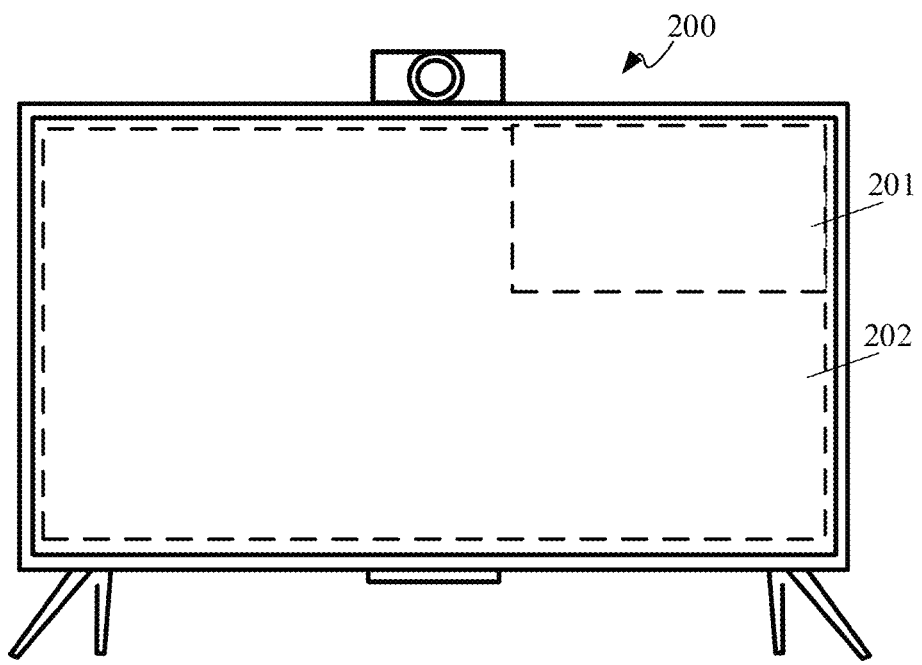
FIG. 4, FIG. 5, FIG. 6, FIG. 7 and FIG. 8 each shows an example schematic diagram of a user interface in the display device 200 according to some embodiments of the application.

FIG. 4 exemplarily illustrates the schematic diagram of a user interface of a display device 200 in an exemplary embodiment. As shown in FIG. 4, the user interface includes multiple view display areas. For example, a first view display area 201 and a playing image 202 are included, where the playing image includes the layout of one or more different items. The user interface further includes a selector for indicating the items being selected, and the position of the selector can be moved via user input, to select different items by changing the positions.

The "item" refers to a visual object displayed in each view display area of the user interface in the display device 200 to represent the corresponding content such as icon, thumbnail, video clip, etc. For example, the item may represent the image content or video clip of a movie or teleplay, the audio content of music, an application, or other history information of the user access content. In the embodiments of the disclosure, the item may be the view interface that appears after the user activates the "look in a mirror" function on the TV device, including icons such as "save", "re-take", etc.

In some embodiments, the "item" may display as an image thumbnail. For example, when the item is a movie or TV drama, the item may be displayed as the poster of the movie or drama. When the item is music, the poster of the music album may be displayed. When the item is an application, it may be displayed as the icon of the application, or when the application is executed recently, a content screenshot of the application may be captured. When the item is the user access history, it may be displayed as a content screenshot in the most recent execution process. The "item" may be displayed as a video clip. For example: the item is dynamic images of the video clip of the trailer of a movie or TV drama.

The items may have the same size or different sizes. In some embodiments, the size of the item may be changed. Specifically, the user can adjust the size of the "item", i.e., the size of the view interface, according to requirements.

The "selector" is used to indicate that any item has been selected, such as: cursor or focus object. The selection is positioned according to the position of the icon or menu touched by the user in the display 200 for information input, so that the movement of the focus object can be displayed in the display device 200 to select a control item, and one or more items can be selected or controlled.

The focus object refers to the object that moves between items according to the user input. Exemplarily, a thick line is drawn on the edge of the item to realize or identify the position of the focus object. In other embodiments, the focus form is not limited to examples and may be a tangible or intangible form (such as a cursor) that can be recognized by the user, for example, may be a 3D deformation of the item or other form, or the identifiers such as border line, size, color, transparency and outline and/or font of the text or image of the focused item may also be changed.

It should be noted that, multiple view display areas can present display images in different layers. For example, the first view display area can present the item contents of video chat, while the second view display area can present the item contents of an application layer (for example, webpage video, VOD display, and application images and the like).

Alternatively, presentations of different view display areas have different priorities, and view display areas with different priorities have different display priorities. For example, the priority of the system layer is higher than the priority of an application layer. When the user uses the acquisition selector and image switching in the application layer, the image display of the view display area of the system layer is not shielded; moreover, when the size and position of the view display area of the application layer are changed according to the selection of the user, the size and position of the view display area of the system layer are not influenced.

The presentation for display images with the same hierarchy can also be presented, at this time, the selector can switch between the first view display area and the second view display area, and when the size and position of the first view display area are changed, the size and position of the second view display area are changed correspondingly.

Since independent operating systems may be respectively installed in the second controller and the first controller, there are two independent but interrelated subsystems in the display device 200. For example, both the second controller and the first controller can be independently installed with Android system and various applications (APP), so that each chip can implement certain functions, and the second controller and the first controller cooperate to realize a certain function.

Therefore, embodiments of the disclosure provides a display device, as shown in FIG. 4, including:

a display 200 configured to display a user interface and/or display an environment scene image; where the user interface includes a plurality of view display areas (including a first view display area 201 and a second view display area 202), where each view display area includes one or more different items, and the user interface further includes a selector for indicating an item being selected, and the position of the selector can be moved through user input, to select different items by changing the positions;

a camera configured to: collect an environment scene image;

a communicator configured to: exchange data with a server; and a controller that communicates respectively with the display 200 and the communicator (as shown in FIG. 1, the controller may include a controller 100A and a controller 100B), where the controller is configured to perform:

while the environment scene image is presented on the display, in response to an instruction for acquiring the environment scene image from a user, uploading the image information corresponding to the environment scene image acquired from the camera to the server;

receiving an address message associated with the image information sent from the server, and controlling the display to present a scene recognition image associated with the address message;

where the scene recognition image is configured for being scanned by a mobile device for acquiring the environment scene image via downloading.

It is noted that, for the display, while displaying an image, only an environment scene image may be displayed in some cases, for example, but not limited to, only when the environment scene image is presented; or only a user interface is displayed in some cases, for example, but not limited to, when the environment scene image does not need to be presented; or, both the user interface and the environment scene image are displayed in some cases.

For example, in an embodiment of the disclosure, the display device may be, but is not limited to, a TV device. When the user scans the scene recognition image for download, it may be implemented by using a mobile device (such as a mobile phone or a tablet computer). Specifically, taking the TV device as an example of the dual-chip structure, it can be seen from the above description of the functional configuration and software system of the display 200 that the first controller of the TV device connects to the external network and establishes a WiFi hotspot, and the second controller connects to this hotspot and shares the first controller network as a subnet device. Based on this, the TV device determines the environment scene image that needs to be shared with the mobile device (that is, the TV device determines that the scene recognition image needs to be presented so that the mobile device can scan the scene recognition image for download). Specifically, the environment scene image may be photos, video or audio data. Meanwhile, the TV device uploads the acquired environment scene image to the server (see FIG. 1, server 300). Taking photos as the scene environment image as an example, the server 300 stores the photos after receiving the photos uploaded from the TV device, and generates a message used by the mobile device to acquire the photo from the TV device.

It should be noted that, for the camera, when the camera is turned on, the camera can capture images in real time and present the captured images on the display.

If the user does not trigger the instruction to acquire an image (for example but not limited to "camera", and the "camera" instruction is taken as an example below for illustration), although the images captured by the camera are presented on the display, the presented images are not stored in the relevant memory; so the images that are not stored in the memory and presented on the display can be referred to as captured images.

If the user sends out the "camera" instruction, the controller can respond to the "camera" instruction and store the captured image in the relevant memory while capturing the image. In this situation, when the controller responds to the "camera" instruction once, a frame of image will be saved. In this case, the saved frame of image can be referred to as the acquired image.

In some exemplary embodiments, the address message carries a Uniform Resource Locator (URL) corresponding to the environment scene image.

The controller is configured to generate a scene recognition image according to the URL.

In some exemplary embodiments, the controller is configured to:

generate a scene recognition image according to the URL when it is determined that the URL is authorized.

In some exemplary embodiments, the scene recognition image is a two-dimensional code image or two-dimensional graphical code image.

FIGS. 5 to 8 exemplarily show schematic diagrams of operations between a user interface in the display device 200 and an instruction sent from a user according to exemplary embodiments.

Figure 5:
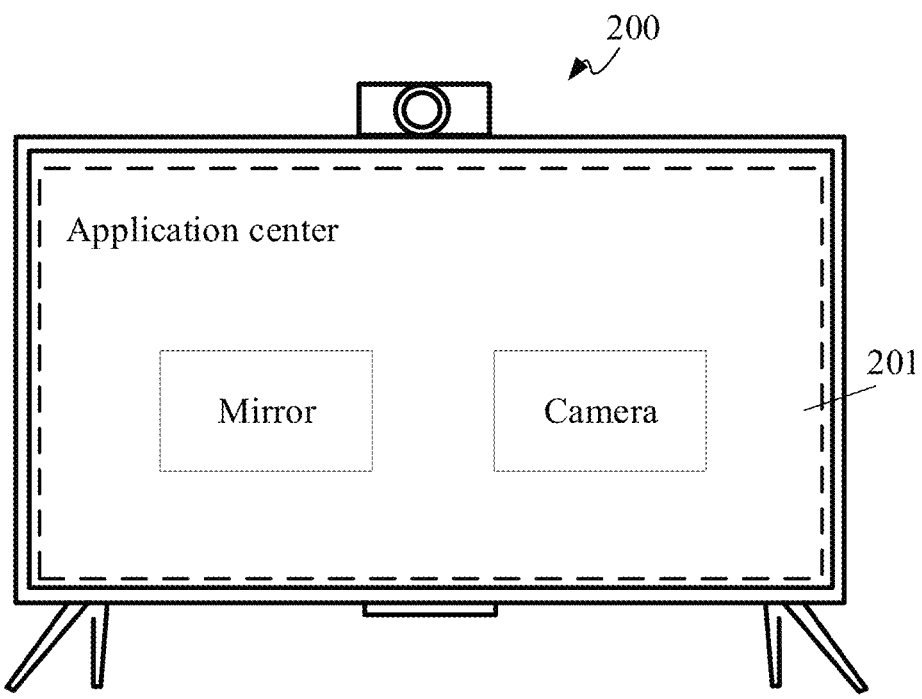
Figure 6:
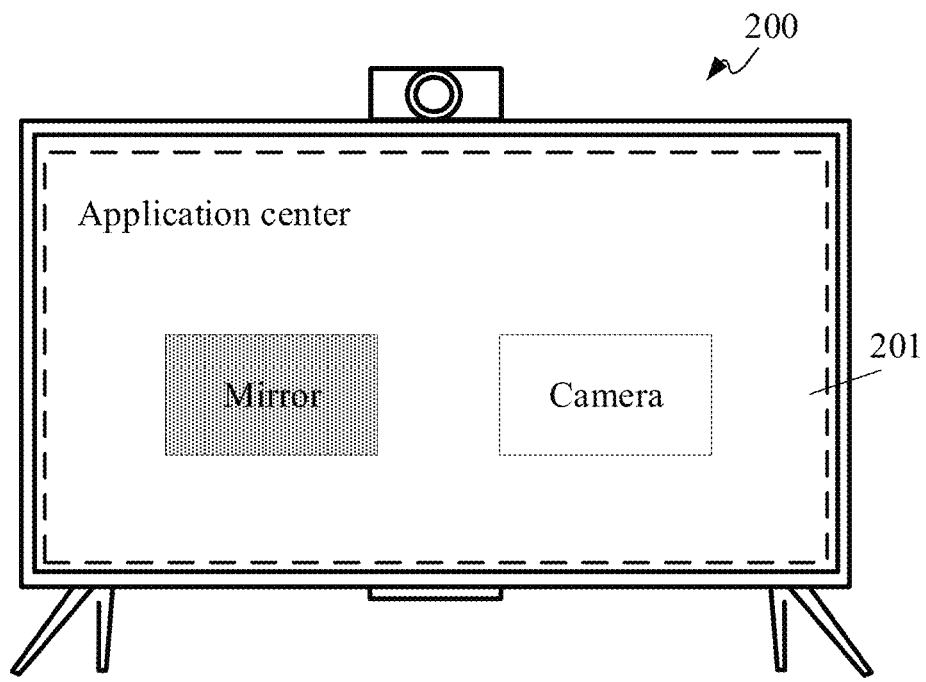
Figure 7:
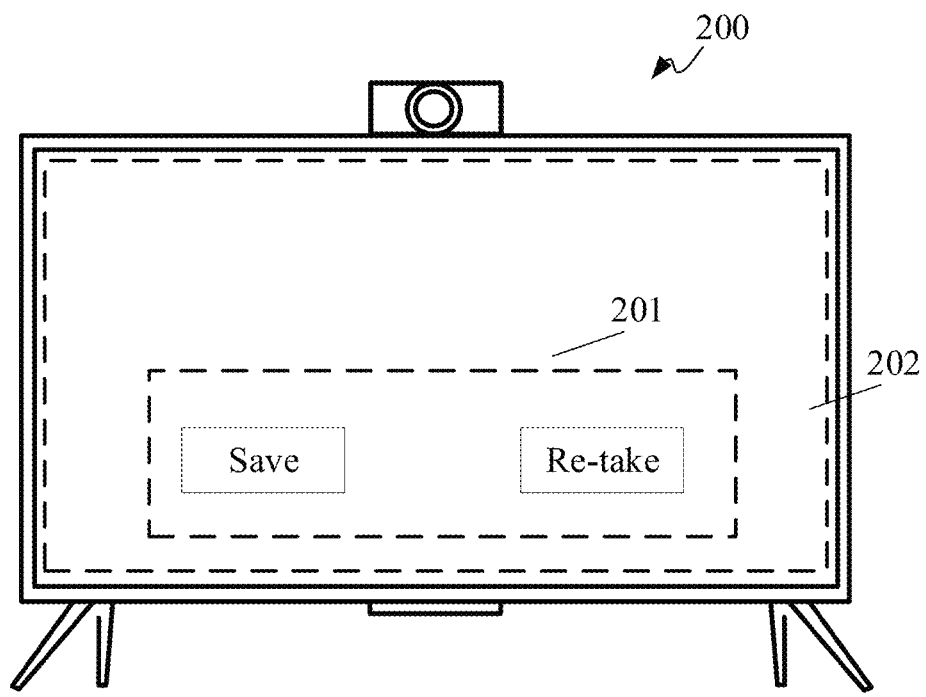
Figure 8:
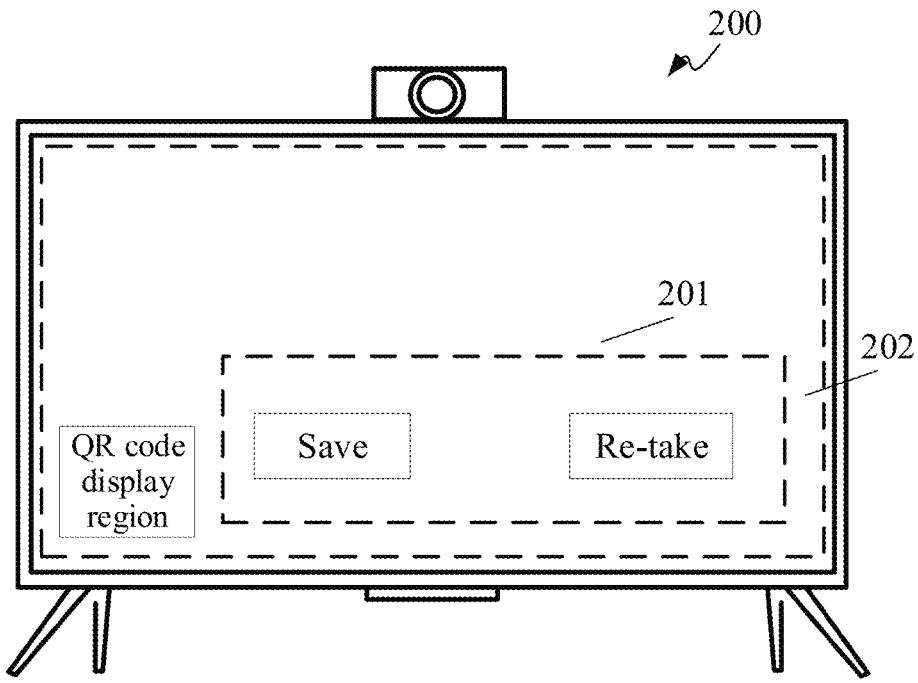

Exemplarily, as shown in FIG. 5, the display interface shown as the application center in the first view display area 201 includes icon option buttons such as "mirror", "camera" etc. FIG. 6 shows that the user has selected the "mirror" icon. As shown in FIG. 7, the display interface shown as the "mirror" function in the first view display area 201 includes icon option buttons such as "save", "re-take" etc. The user clicks on the icon to select through a remote control and other devices. Meanwhile, the second view display area 202 displays the photo the user has taken. When the user clicks the "save" icon, the two-dimensional code or two-dimensional graphical code corresponding to the photo saved by the user is displayed in the second view display area 202, as shown in FIG. 8. The user can use a mobile device to scan the two-dimensional code or two-dimensional graphical code presented on the TV device through a browser or WeChat or other applications that support scanning, to actually access the Uniform Resource Locator (URL) of the photo. That is, a web page associated with photos is opened through the URL, where the web page provides users with options to save images, share images and other options.

The TV according to the embodiments of the disclosure can be used for social networking due to a built-in camera, so it can be called, for example, a social TV or a new TV.

The TV (i.e., display device) according to the embodiments of the disclosure can take photos or videos of a user and share them with the mobile device such as mobile phone of the user in real time.

Figure 9:
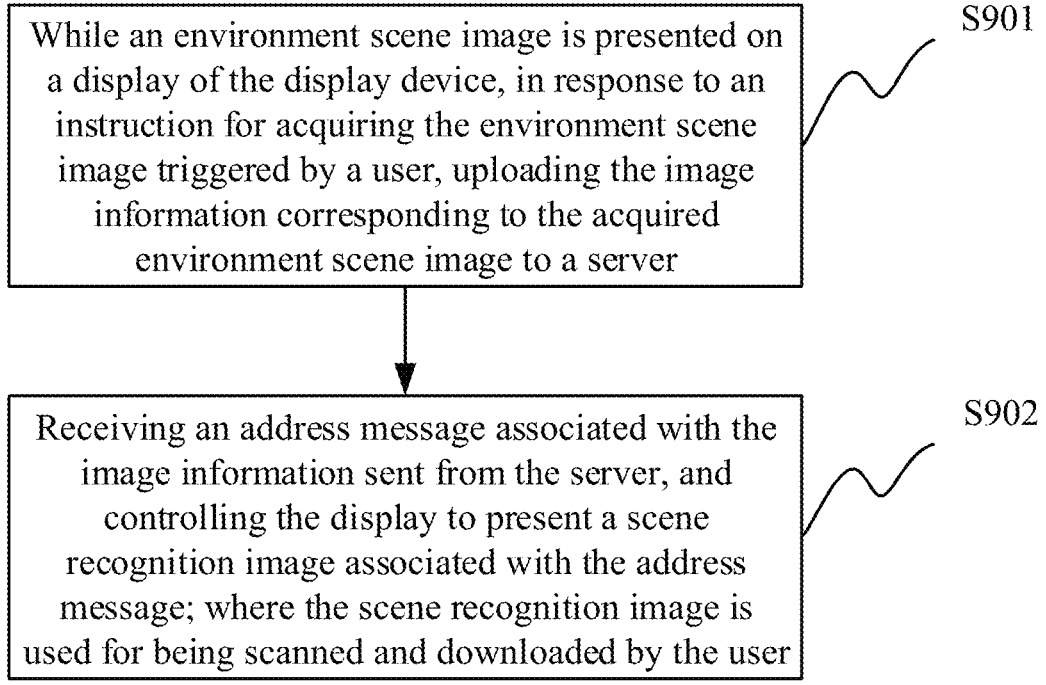
FIG. 9 shows an example schematic flowchart of a data transmission method according to some embodiments of the application.

Therefore, based on the same inventive concept, for example, on the TV device, an embodiment of the disclosure provides a data transmission method applied to a display device. Referring to FIG. 9, the method includes the following.

S901: while an environment scene image is presented on a display of the display device, in response to an instruction for acquiring the environment scene image from a user, uploading the image information corresponding to the acquired environment scene image to a server.

S902: receiving an address message associated with the image information sent from the server, and controlling the display to present a scene recognition image associated with the address message; where the scene recognition image is configured for being scanned and downloaded by the user.

Figure 10:
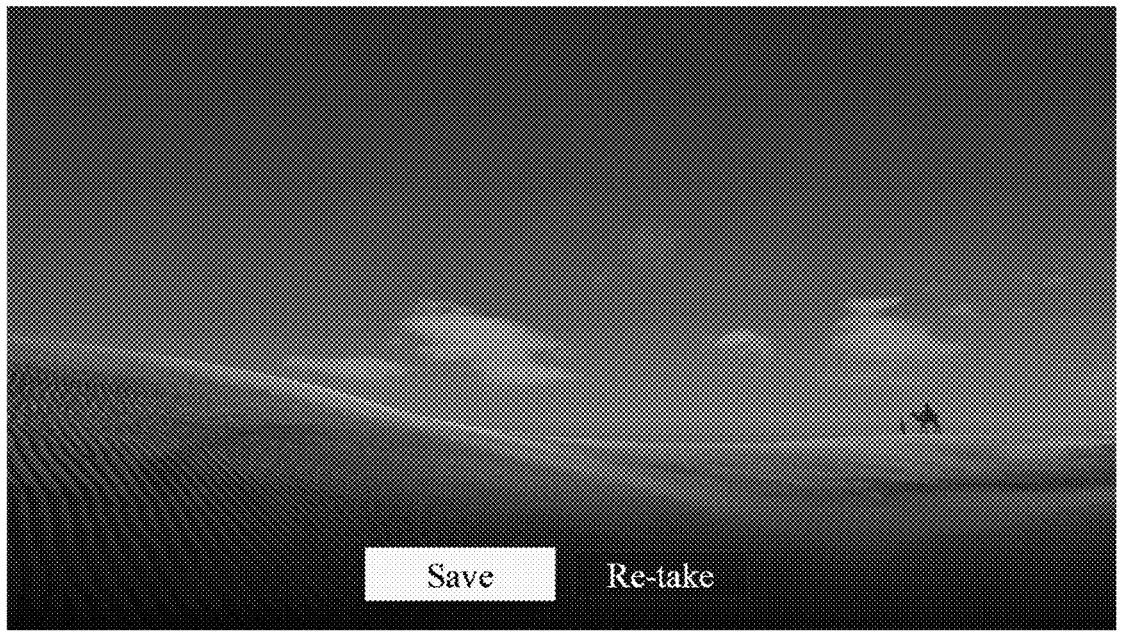
FIG. 10, FIG. 11, FIG. 12, and FIG. 13 each illustrates example presentation effect of a data transmission method according to some embodiments of the application.

For example, the user selects the "mirror" option on the user interface presented by the display device. The "mirror" function may specifically include taking a photo or recording a video. In the embodiments of the disclosure, the user chooses to take a photo as an example for illustration. The environment scene image is the photo that the user wants to download from the TV device. On the TV device, after the photo taking page is opened (that is, the camera is turned on), the user controls the operation of taking a photo through a remote control and stores the images in JPG format under the external storage path "/storage/emulated/0/Mirror/photo/" of the chip. Meanwhile, the TV device is able to automatically add a monitor service for monitoring server messages, that is, upload photos acquired according to the user's needs to the server. In some exemplary embodiments, regardless of whether the user chooses to save the photo, the photo is uploaded to the server as long as the photo taken function is executed. The user can select the save function or re-take function presented on the user interface after the photo is taken as needed, and the implementation effect is as shown in FIG. 10.

In some exemplary embodiments, the user operates the remote control or touches the TV screen, etc., to allow a USB disk to be selected for downloading the taken photos from the TV after the TV takes the photo.

In some exemplary embodiments, the user may use the remote control or touch the TV screen, etc. to click the application options displayed in the first view area on the TV device, referring to FIG. 3B, click the "application center" icon to enter the application center, and the displayed user interface is shown in FIG. 5. The user uses the remote control or touches the TV screen to start the "mirror" application, referring to FIG. 6, which shows that the "mirror" application is selected by the user. In some exemplary embodiments, the application center may also include a "camera" application. The embodiments of the disclosure do not limit the category and number of applications. The camera on the TV device receives an instruction to acquire the environment scene image sent from the controller, that is, the user selects the "mirror" application. In this situation, since the controller 100 such as the remote control is connected to the chip in the TV device, the key instruction recognition module interacts instructions with the controller 100, for example, a photo stored in the TV device is clicked to be selected by the controller, and the correspondence with the instructions in the graphics database is formed to cause the instruction control on the TV device. Further, the photo saved in the TV device that the user needs to acquire on the mobile device may be selected, where this photo may be a photo taken by the user using the "mirror" function. FIG. 7 is the user interface after taking a photo. The display interface shown as the "mirror" function in the first view display area 201 includes icon option buttons such as "save", "re-take" etc. The user clicks on the icon to select through a remote control and other devices. At the same time, the second view display area 202 displays the image the user has taken. When the user clicks the "save" icon by using the remote control or touching the TV screen or other operations, the two-dimensional code or two-dimensional graphical code corresponding to the image saved by the user is displayed in the second view display area 202, as shown in FIG. 8.

In some exemplary embodiments, in step S902, the address message carries a Uniform Resource Locator (URL) corresponding to the environment scene image.

A scene recognition image is generated based on the URL.

In some exemplary embodiments, generating the scene recognition image according to the URL, specifically includes:

generating the scene recognition image according to the URL when it is determined that the URL is authorized.

In some exemplary embodiments, before uploading the image information corresponding to the acquired environment scene image to the server, the method further includes:

starting an upload callback monitor function.

In some exemplary embodiments, the upload callback monitor function may be started:

1. when the instruction for acquiring the environment scene image is triggered by the user;

2. before the instruction for acquiring the environment scene image is triggered by the user;

3. after the instruction for acquiring the environment scene image is triggered by the user.

Figure 11:
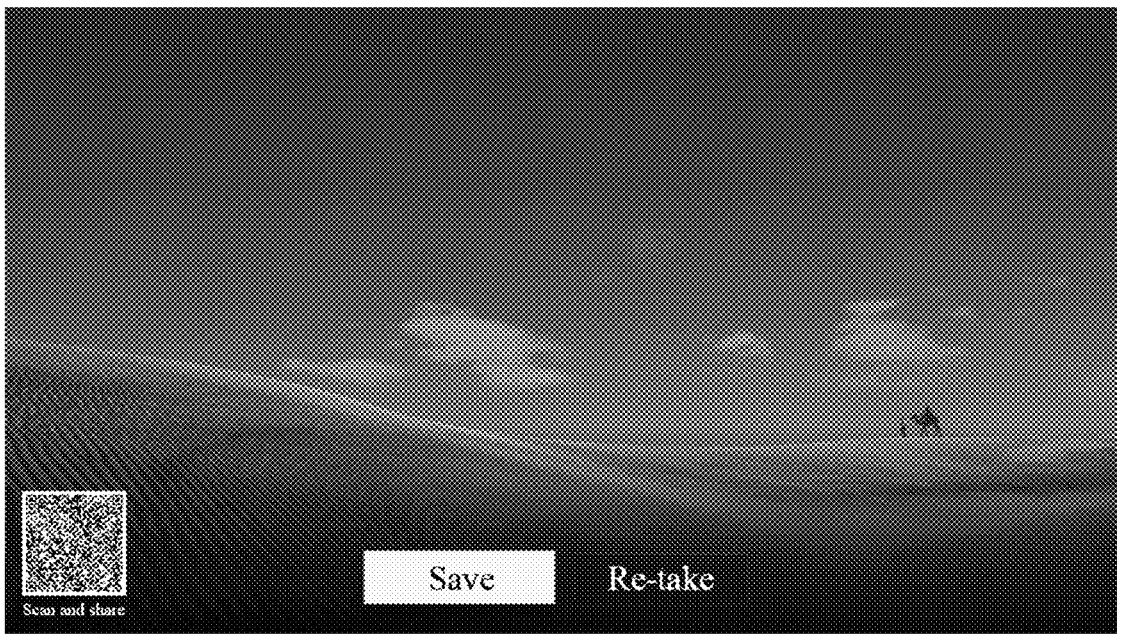

For example, after receiving a photo uploaded from the TV device, the server stores the photo and generates a Uniform Resource Locator (URL) that can access the photo, and returns to the TV device through a network request. The TV device monitors the callback, that is, parses the URL of the photo from the address message and determines its authorization after receiving the address message returned from the server. When the URL is authorized, it will be converted into a two-dimension code image and displayed on the user interface of the TV device, and the implementation effect is shown in FIG. 11.

Figure 12:
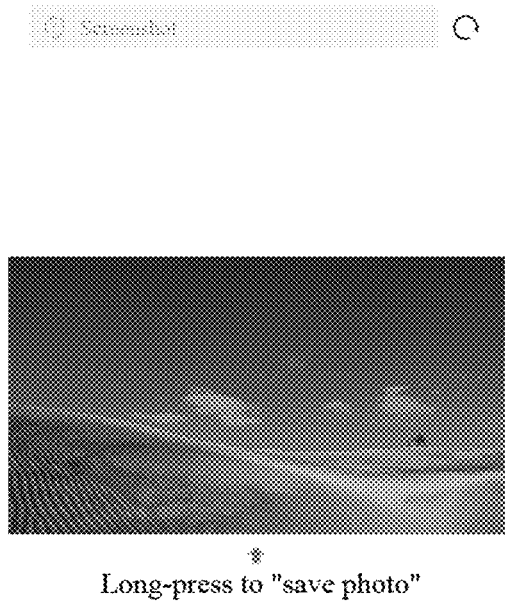
Figure 13:
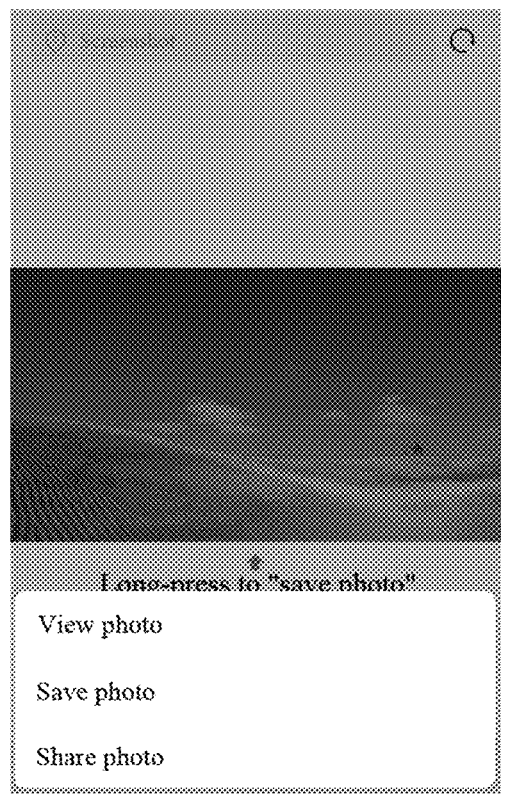

Correspondingly, in some exemplary embodiments, the user uses a mobile device to scan the two-dimension code presented on the user interface of the TV device through a browser or other applications that support scanning, and access the URL of the photo(s) by scanning the two-dimension code, that is, open a web page associated with the photos through the URL, where the web page provides users with options to save images, share images and other operations. Specifically, as shown in FIGS. 12 and 13, the user can press and hold the photo on the mobile device to trigger the user interface of the mobile device to display the operation options (such as "view photo", "save photo", "share photo") for the user to choose.

Specifically, after the user presses and holds the photo on the mobile device, the user interface of the mobile device displays function selection icons from top to bottom, including" view photo", "save photo", "share photo", etc. The presentation mode of the icons is not limited.

In some exemplary embodiments, after the user clicks the "view photo" icon, the photo can be zoomed in or zoomed out by double-clicking, sliding, or other shortcut gestures.

In some exemplary embodiments, the user can also press and hold the photo to trigger photo editing functions such as "crop", "rotate" and "beautify" for the user to choose.

In some exemplary embodiments, after the user clicks the "save photo" icon, the user interface of the mobile device displays a path for saving the photo, for example, a folder in the memory of the mobile device.

In some exemplary embodiments, when the user clicks the "share photo" icon, the user interface of the mobile device displays the application software, such as social software, music software, etc., installed in the mobile device where the photos can be shared. The user share photos by clicking the icon of the application.

In some exemplary embodiments, when the user does not install the default application software displayed on the user interface, the photo sharing function can be implemented by logging into the application of web version authorized by the user.

In some exemplary embodiments, when the user clicks any one of the above function selection icons and enters a corresponding interface, the user interface will continue to float the "back" icon, and the user can return to the previous operation step by touching the "back" icon or the back function button of the mobile device. When the back function is triggered, the user interface will pop up "Cancel" and "OK" icons to prevent the user operation error.

Similarly, when the user selects the "camera" function of the interface shown in FIG. 6, the operation steps are similar to the above-mentioned operation process, and thus will not be repeated.

Figure 14:
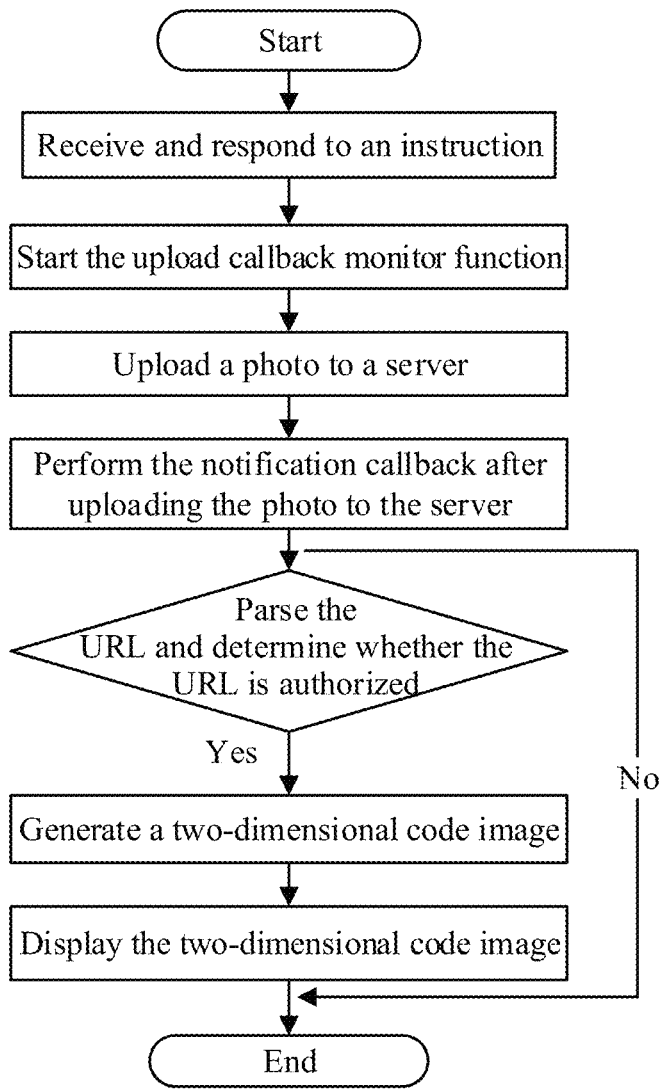
FIG. 14 shows a schematic diagram of the operation flow of a data transmission method according to some embodiments of the application.

In summary, for example, on the TV device, taking the determination of whether the URL is authorized as an example, the specific operation flow is shown in FIG. 14.

Step 141: receive an instruction triggered by a user to acquire an environment scene and respond to the instruction.

Step 142: start the upload callback monitor function.

Step 143: upload the acquired environment scene to a server.

That is, the TV device uploads the taken photos to the server, and in some exemplary embodiments, can be connected to the WiFi hotspot provided by the first controller via the second controller and upload the local photos to the backend server through a network request.

Step 144: perform the notification callback after uploading the photo to the server.

That is, the server receives the photo uploaded from the TV device and then stores it, generates a URL that can access the photo, and sends the URL of the photo to the TV device through a network request.

Step 145: determine whether the URL is authorized when a URL is monitored by parsing according to the callback; if it is authorized, the process goes to step 146; otherwise, end the process.

Step 146: convert the URL into a two-dimensional code image or two-dimensional graphical code image and display it on the user interface.

Figure 15:
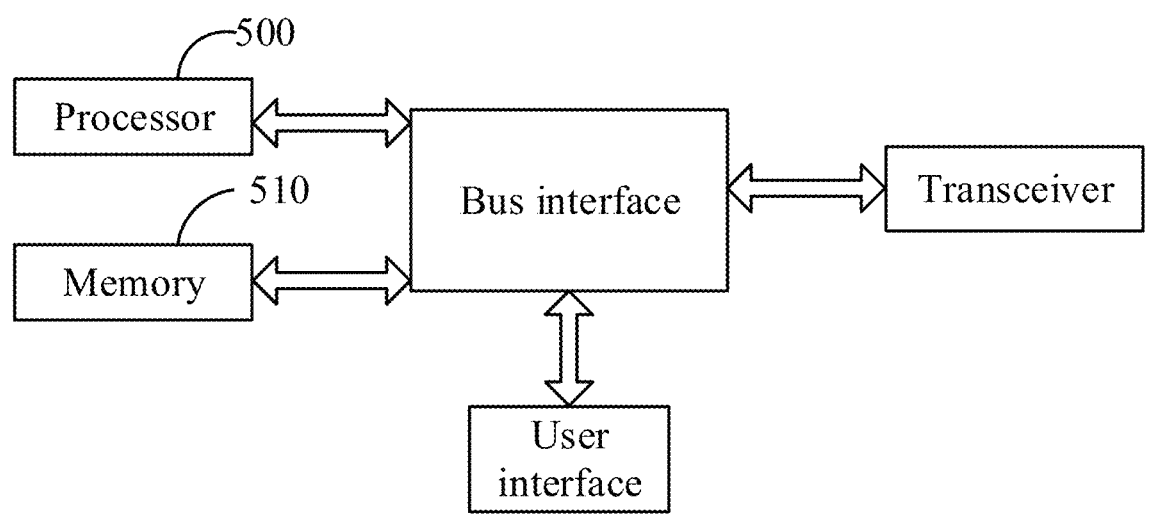
FIG. 15 shows a structural schematic diagram of a computing device according to some embodiments of the application.

Based on the same inventive concept, an embodiment of the disclosure further provides a computing device, referring to FIG. 15, including:

a memory 510 configured to store program instructions;

a processor 500 configured to read the program instructions in the memory 510 and perform the above data transmission method according to the obtained program instructions.

Here, in FIG. 15, the bus architecture can include any numbers of interconnected buses and bridges, and specifically link various circuits of one or more processors represented by the processor 500 and the memory represented by the memory 510. The bus architecture may further various other circuits such as peripheral device, voltage regulator and power management circuit, which are all well known in the art and thus will not be further described again herein. The bus interface provides an interface.

Based on the same inventive concept, an embodiment of the disclosure provides a computer storage medium for storing the computer program instructions used by the apparatuses in the embodiments of the disclosure described above, where the computer storage medium contains the programs for performing any one of the methods in the embodiments of the disclosure described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

In summary, the embodiments of the disclosure provide a data transmission method and device, so as to conveniently acquire the images taken by a television on the mobile device side.

Based upon the exemplary embodiments shown in the disclosure, all of other embodiments obtained by those ordinary skilled in the art without creative work pertain to the protection scope of the disclosure. In addition, although the disclosure in the disclosure is introduced according to one or more exemplary examples, it should be understood that various aspects of the disclosure may also constitute a complete technical solution separately.

It should be understood that the terms "first", "second", "third" and the like in the specification and claims as well as the above drawings in the disclosure are used to distinguish similar objects, but not necessarily to indicate a particular order or sequence. It should be understood that the data used in this way is interchangeable under appropriate circumstances, for example, it can be implemented in an order other than those given in the illustration or description of the embodiments of the disclosure.

In addition, the terms "include" and "have" and any variations thereof mean covering but non-exclusive inclusion, for example, a product or device that contains a series of components is not necessarily limited to those components listed clearly, but may include other components not listed clearly or inherent to the product or device.

Finally, it should be noted that the above embodiments are only used to illustrate but not to limit the technical solutions of the disclosure; although the disclosure has been illustrated in details by reference to the above embodiments, it should be understood by those ordinary skilled in the art that they can still modify the technical solutions in the above embodiments or equivalently replace some or all of the technical features therein; and these modifications and replacements do not make the essence of the corresponding technical solutions depart from the scope of the technical solutions of the embodiments of the disclosure.

It should be understood by those skilled in the art that the embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer readable storage mediums (including but not limited to magnetic disk memories, optical memories and the like) containing computer readable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of causing the computer or another programmable data processing device to operate in a particular way, so that the instructions stored in the computer readable memory produce the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the disclosure without departing from the spirit and scope of the disclosure. Thus the disclosure is also intended to encompass these modifications and variations therein as long as these modifications and variations to the disclosure fall within the scope of the claims of the disclosure and their equivalents.

The invention claimed is:

1. A smart television, comprising:
a camera configured to collect at least one environment scene image;
a display configured to display a user interface, wherein the user interface comprises the environment scene image;
a communication circuitry configured to exchange data with a server;
a remote controller; and
a controller, in communication with the display, the communication circuitry and the remote controller and configured to:
while the at least one environment scene image collected by the camera in real time is presented on the user interface, in response to a command for acquiring a current environment scene image among the at least one environment scene image from a user, present a first view display area and a second display area on the user interface, wherein the first view display area includes a first button for saving the current environment scene image, and the second view display area is configured for presenting the current environment scene image;
in response to a selection of the first button via the remote controller from the user, upload image information corresponding to the current environment scene image to the server;
receive an address message of the current environment scene image sent from the server, and control the display to present in a first sub-area of the second view display area a scene recognition image for the address message of the current environment scene image;
wherein the scene recognition image is configured for being scanned by another device outside the smart television for downloading the current environment scene image.

2. The smart television according to claim 1, wherein the scene recognition image is a two-dimensional graphical code.

3. The smart television according to claim 1, wherein the controller is further configured to:
start an upload callback monitor service for monitoring messages about the current environment scene image from the server, in response to the selection of the first button.

4. The smart television according to claim 3, wherein the controller is further configured to:
cause the upload callback monitor service to monitor an address message of the current environment scene image from the server;
upon receiving the address message from the server, parse a Uniform Resource Locator (URL) of the current environment scene image from the address message and determine whether the URL is authorized;
in response to determining the URL being authorized, convert the URL into a two-dimensional graphical code and present the two-dimensional graphical code as the scene recognition image in the first sub-area on the display.

5. The smart television according to claim 4, wherein the URL of the current environment scene image is directed to a web page which provides a first option for saving the current environment scene image and a second option for sharing the current environment scene image.

6. A method for a smart television, comprising:
while the at least one environment scene image collected by a camera of a smart television in real time is presented on a user interface of the smart television, in response to a command for acquiring a current environment scene image among the at least one environment scene image from a user, presenting a first view display area and a second display area on the user interface, wherein the smart television comprises a remote controller and a communicator configured to exchange data with a server; the first view display area includes a first button for saving the current environment scene image, and the second view display area is configured for presenting the current environment scene image;
in response to a selection of the first button via the remote controller from the user, uploading to a server image information corresponding to the current environment scene image;
receiving an address message of the current environment scene image sent from the server, and controlling a display of the smart television to present in a first sub-area of the second view display area a scene recognition image for the address message of the current environment scene image;

wherein the scene recognition image is configured for being scanned by another device outside the smart television for downloading the current environment scene image.

7. The method according to claim 6, wherein the scene recognition image is a two-dimensional graphical code.

8. The method according to claim 6, further comprising:
starting an upload callback monitor service for monitoring messages about the current environment scene image from the server, in response to the selection of the first button.

9. The method according to claim 8, wherein the method further comprises:
causing the upload callback monitor service to monitor an address message of the current environment scene image from the server;
upon receiving the address message from the server, parsing a Uniform Resource Locator (URL) of the current environment scene image from the address message and determine whether the URL is authorized;
in response to determining the URL being authorized, converting the URL into a two-dimensional graphical code and present the two-dimensional graphical code as the scene recognition image in the first sub-area on the display.

10. The method according to claim 9, wherein the URL of the current environment scene image is directed to a web page which provides a first option for saving the current environment scene image and a second option for sharing the current environment scene image.

11. A non-transitory computer readable storage medium for storing programs, wherein the programs, when executed by a processor, cause the processor to:
while the at least one environment scene image collected by a camera of a smart television in real time is presented on a user interface of the smart television, in response to a command for acquiring a current environment scene image among the at least one environment scene image from a user, present a first view display area and a second display area on the user interface, wherein the first view display area includes a first button for saving the current environment scene image, and the second view display area is configured for presenting the current environment scene image;

in response to a selection of the first button via a remote controller from the user, upload to a server image information corresponding to the current environment scene image;

receive an address message of the current environment scene image sent from the server, and controlling a display of the smart television to present in a first sub area of the second view display area a scene recognition image for the address message of the current environment scene image;

wherein the scene recognition image is configured for being scanned by another device for downloading the current environment scene image.

12. The non-transitory computer readable storage medium according to claim 11, wherein the programs, when executed by the processor, cause the processor to:
start an upload callback monitor service for monitoring messages about the current environment scene image from the server, in response to the selection of the first button via the remote controller.

13. The non-transitory computer readable storage medium according to claim 12, wherein the programs, when executed by the processor, further cause the processor to:
cause the upload callback monitor service to monitor an address message from the server;
upon receiving the address message from the server, parse a Uniform Resource Locator (URL) of the current environment scene image from the address message and determine whether the URL is authorized;
in response to determining the URL being authorized, convert the URL into a two-dimensional graphical code and present the two-dimensional graphical code as the scene recognition image in the first sub-area on the display.

14. The non-transitory computer readable storage medium according to claim 13, wherein the URL of the current environment scene image is directed to a web page which provides a first option for saving the current environment scene image and a second option for sharing the current environment scene image.

* * * * *